United States Patent [19]

Zwiener et al.

[11] Patent Number: 5,623,045

[45] Date of Patent: Apr. 22, 1997

[54] PROCESS FOR THE PREPARATION OF COATINGS

[75] Inventors: Christian Zwiener, Köln; Reinhard Halpaap, Odenthal; Josef Pedain, Köln; Wolfgang Kiel, Odenthal, all of Germany

[73] Assignee: Bayer Aktiengesellschaft, Leverkusen, Germany

[21] Appl. No.: 430,045

[22] Filed: Apr. 27, 1995

[30]   Foreign Application Priority Data

May 5, 1994 [DE] Germany .................. 44 15 778.9

[51] Int. Cl.$^6$ ................................................ C08G 18/32
[52] U.S. Cl. ........................ 528/68; 528/45; 528/73; 528/75; 528/84; 427/385.5; 524/772
[58] Field of Search .................. 528/68, 73, 75, 528/84, 45; 427/385.5; 524/772

[56]   References Cited

U.S. PATENT DOCUMENTS

| | | | |
|---|---|---|---|
| 3,420,800 | 1/1969 | Haggis | 528/59 |
| 3,567,692 | 3/1971 | Haggis et al. | 528/64 |
| 4,481,345 | 11/1984 | Nachtkamp et al. | 528/59 |
| 5,126,170 | 6/1992 | Zwiener et al. | 427/385.5 |
| 5,214,086 | 5/1993 | Mormile et al. | 524/237 |
| 5,236,741 | 8/1993 | Zwiener et al. | 427/385.5 |

*Primary Examiner*—Rachel Gorr
*Attorney, Agent, or Firm*—Joseph C. Gil; Thomas W. Roy

[57]   ABSTRACT

A process for the preparation of coatings using a coating composition having a binder containing a two-component system of a) a polyisocyanate component and b) an isocyanate-reactive component b) which is essentially free from hydroxyl groups and contains b1) 5 to 95 parts by weight of a polyamine containing ester groups and secondary amino groups and b2) 5 to 95 parts by weight of polyketimines.

11 Claims, No Drawings

PROCESS FOR THE PREPARATION OF COATINGS

BACKGROUND OF THE INVENTION

1. Field of the Invention

The present invention relates to a new process for the preparation of coatings on any substrates using a coating composition having a two-component binder containing a polyisocyanate component and a special, essentially hydroxyl group-free, isocyanate-reactive component.

2. Description of the Prior Art

Two-component coating compositions which contain as binder a polyisocyanate component in combination with a reactive component capable of reacting with isocyanate groups, particularly a polyhydroxyl component, are known. They are suitable for the preparation of high quality coatings which may be rendered rigid, elastic, resistant to abrasion and to solvents and, above all, resistant to weathering.

The process according to the invention described in more detail below involves the use of new types of two-component coating compositions wherein the binder is based on a two-component system of a polyisocyanate component and an isocyanate-reactive component. This isocyanate-reactive component contains a mixture of compounds having ketimine groups (hereinafter known as polyketimines) with certain secondary polyamines described in more detail below.

The secondary polyamines are the polyaspartic esters described in EP-A-0,403,921. These amines are particularly suitable, in combination with lacquer polyisocyanates, as binders in low-solvent or solvent-free coating compositions and provide rapid curing of the coatings at low temperatures.

The use of polyketimines capable of reacting with polyisocyanates under the influence of moisture for the preparation of polyurethane coatings (the term "polyurethane" also including polyureas) is well known and described, for example, in DE-OS 1,520,139 or DE-OS 3,308,418.

Coating compositions are described in EP-A 0,531,249 which contain as binder a polyisocyanate component which is in combination with an isocyanate-reactive component or which is reactive under the influence of moisture. In one embodiment of this application, the reactive component is a mixture of hydroxy-functional resins with polyaldimines or polyketimines and the above-mentioned polyaspartic esters.

The use of mixtures of polyaspartic esters and polyketimines as the reactive component is not mentioned in EP-A 0,403,921, while according to EP-A 0,531,249 this mixture must also contain hydroxy-functional resins. The reactive component for the polyisocyanate is composed of three completely different individual components, which leads to increased expenditure during the formulation of a lacquer and, also, restricts the mixing ratio between the polyketimines and polyaspartic esters. In addition, it has previously not been possible to prepare hydroxy-functional compounds that have low viscosities similar to polyketimines or polyaspartic esters and yet at the same time exhibit indispensable resin character during curing with low molecular weight, high-functionality polyisocyanates. Therefore, substantial quantities of organic solvents must also be used when such ternary reactive components are employed, which renders the preparation of coating compositions having a high solids content impossible.

It has now been surprisingly found that the use of compounds having hydroxyl groups in combination with polyaspartic esters and polyketimines may be dispensed with altogether in such coating compositions, resulting in compositions which have a high solids content and, after rapid partial drying, exhibit good resistance properties, e.g. resistance to scratching and solvents.

SUMMARY OF THE INVENTION

The present invention relates to a process for the preparation of coatings by coating a substrate with a coating composition having a two-component binder containing a) a polyisocyanate component and b) an isocyanate-reactive component which is essentially free of hydroxyl groups and contains b1) 5 to 95 parts by weight of compounds having the formula

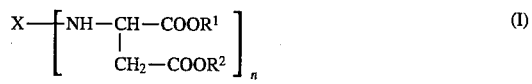

wherein

X represents an n-valent radical which is inert towards isocyanate groups and obtained by removing the primary amino groups from an organic polyamine having a number average molecular weight ($M_n$) of 60 to 6000 and containing n (cyclo)aliphatically bound amino groups, $R^1$ and $R^2$ represent the same or different alkyl radicals having 1 to 18 carbon atoms, n represents a whole number of at least 2 and b2) 5 to 95 parts by weight of compounds having a number average molecular weight ($M_n$) of 140 to 6500 and having at least two ketimine units per molecule corresponding to the formula

wherein the sum of the parts by weight of components b1) and b2) is 100, based on the weight of component b1) and b2).

DETAILED DESCRIPTION OF THE INVENTION

The known lacquer polyisocyanates having (cyclo)aliphatically bound isocyanate groups may be used as polyisocyanate component. a) in the process according to the invention. These include, in particular, modified polyisocyanates prepared from (cyclo)aliphatic diisocyanates and having a molecular weight of 168 to 300, such as hexamethylene diisocyanate, 2,2,4- and/or 2,4,4-trimethylhexamethylene diisocyanate, 2-methyl-1,5-diisocyanatopentane, 1,4-diisocyanatocyclohexane, 1-isocyanato-3,3,5-trimethyl-5-isocyanatomethyl cyclohexane (IPDI) and/or 1-isocyanato-1-methyl-3(4)-isocyanatomethyl cyclohexane.

The modified polyisocyanates are selected from known lacquer polyisocyanates prepared from the preceding diisocyanates and containing biuret groups, isocyanurate groups, isocyanurate and uretdione groups, isocyanurate and allophanate groups or urethane groups. The corresponding derivatives of aromatic diisocyanates such as 2,4- and/or 2,6-diisocyanatotoluene, are also suitable in principle, but less preferred.

Modified polyisocyanates having urethane groups include, in particular, those prepared from low molecular weight polyhydroxyl compounds having a molecular weight of 62 to 299, such as ethylene glycol, propylene glycol and/or trimethylolpropane.

Particularly preferred lacquer polyisocyanates for use as component a) are modified polyisocyanates having an NCO content of 16 to 24% by wt. and a maximum viscosity at 23° C. of 5000, preferably 3000 mPa.s, especially modified polyisocyanates prepared from hexamethylene diisocyanate.

Component b1) is selected from compounds having the formula

wherein X, $R^1$, $R^2$ and n have the meanings previously set forth.

The compounds according to formula I are also known as polyaspartic esters. In these compounds n preferably represents 2. X preferably represents a divalent hydrocarbon radical obtained by removing the amino groups from 1-amino-3,3,5-trimethyl-5-aminomethylcyclohexane, 4,4'-diaminodicyclohexylmethane, 3,3'-dimethyl-4,4'-diaminodicyclohexylmethane, hexahydro-2,4- and/or 2,6-diaminotoluene, the isomers of monomethyl-diaminodicyclohexylmethane, and 3(4)-aminomethyl-1-methylcyclohexyl-amine.

Preferred starting compounds b1) include those wherein $R^1$ and $R^2$ represent a methyl, ethyl, n-butyl or 2-ethylhexyl group.

The preparation of starting compounds b1) takes place in known manner by reacting the primary polyamines having the formula

with esters of maleic or fumaric acid having the formula

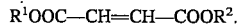

Suitable polyamines include those having a number average molecular weight ($M_n$) of 60 to 6000, preferably 88 to 2 000 and more preferably 88 to 238, such as ethylene diamine, 1,2-diaminopropane, 1,4-diaminobutane, 1,6-diaminohexane, 2-methyl-1,5-diaminopentane, 2,5-diamino-2,5-dimethylhexane, 2,2,4- and/or 2,4,4-trimethyl-1,6-diaminohexane, 1,11-diaminoundecane, 1,12-diaminododecane, 1-amino-3,3,5-trimethyl-5-aminomethylcyclohexane, hexahydro-2,4- and/or 2,6-diaminotoluene, other alkyl substituted cyclohexanediamines (such as isopropyl-2,4- and/or 2,6-diaminocyclohexane), 2,4'- and/or 4,4'-diaminodicyclohexylmethane, 3,3'-dimethyl-4,4'-diaminodicyclohexylmethane, the isomers of diaminodicyclohexylmethane having a methyl group as a substituent (i.e., C-monomethyl-diaminodicyclohexylmethane), and 3(4)-aminomethyl-1-methylcyclohexylamine. Also suitable, although less preferred, are polyether polyamines with 2 or 3 aliphatically bound primary amino groups having a number average molecular weight ($M_n$) of 148 to 6000. Examples of these polyether polyamines are marketed by Texaco under the Jeffamine tradename.

Esters of maleic or fumaric acid suitable for the preparation of starting compounds b1) include the dimethyl ester, diethyl ester, di-n- or isopropyl ester, di-n-butyl ester or di-2-ethylhexyl ester of maleic acid and the corresponding esters of fumaric acid.

The preparation of polyaspartic esters b1) from the starting materials may take place at a temperature of 0° to 100° C. with the use of quantity ratios such that for each primary amino group there is at least one, preferably one, olefinic double bond. One of the starting materials may be used in excess and then may be separated by distillation after the reaction. The reaction may take place in the absence or in the presence of suitable solvents such as methanol, ethanol, propanol, ethyl- or butyl acetate and mixtures of these solvents. Component b2) is selected from ketimines having at least two structural units per molecule corresponding to the formula

These polyketimines have a number average molecular weight ($M_n$) of 140 to 6500, preferably 140 to 2500 and more preferably 140 to 458. The molecular weight may be determined as the sum of the atomic weights of the individual elements, may be calculated from the functionality and the functional group content (for example, by determining the primary amino groups present after hydrolysis) or, in the case of compounds with a higher molecular weight, determined by gel permeation chromatography using polystyrene as the standard.

The preferred polyketimines include compounds corresponding to the formula

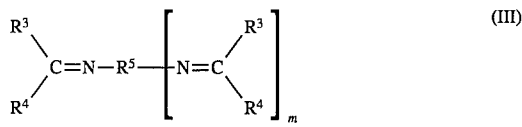

wherein $R^3$ and $R^4$ may be the same or different and represent inert organic radicals such as, hydrocarbon radicals having up to 8 carbon atoms, preferably alkyl radicals having 1 to 8 carbon atoms, or the radicals $R^3$ and $R^4$, together with the carbon atom, may form a 5- or 6-membered cycloaliphatic ring, $R^5$ represents an (m+1)-valent radical, obtained by removing the primary amino groups from a polyamine having a number average molecular weight ($M_n$) of 88 to 2000, having (cyclo)aliphatically bound amino groups and optionally containing oxygen- and/or nitrogen atoms and m is 1 to 3.

Compounds corresponding to formula III) wherein the radicals $R^3$ and $R^4$ represent hydrocarbon radicals having up to 8 carbon atoms and m=1 are particularly preferred.

The ketones which may be used for the preparation of the polyketimines correspond to the formula

and preferably have a molecular weight of 58 to 198.

Suitable ketones include acetone, methylethyl ketone, methylpropyl ketone, methylisopropyl ketone, methylbutyl ketone, methylisobutyl ketone, methyl-tert.-butyl ketone, methyl-n-amyl ketone, methylisoamyl ketone, methylheptyl ketone, methylundecyl ketone, diethyl ketone, ethylbutyl ketone, ethylamyl ketone, diisopropyl ketone, diisobutyl ketone, cyclohexanone, cyclopentanone, methylcyclohexanone, isophorone, 5-methyl-3-heptanone, 1-phenyl-2-propanone, acetophenone, methylnonyl ketone, dinonyl ketone, 3,3,5-trimethyl-cyclohexanone.

Preferred ketones include cyclopentanone, cyclohexanone, methylcyclopentanone, methylcyclohexanone, 3,3,5-trimethylcyclopentanone, cyclobutanone, methylcyclobutanone, acetone, methylethyl ketone and methylisobutyl ketone. Mixtures of ketones may also be used.

The polyamines used for the preparation of the compounds b2) are organic compounds having at least two and preferably 2(m=1) aliphatically and/or cycloaliphatically bound primary amino groups. The use of amines having aromatically bound amino groups is possible but less preferred. They have a number average molecular weight $M_n$ of 60 to 6000, preferably 88 to 2000 and more preferably 88 to 238. Suitable polyamines for the preparation of the component b2) include those previously disclosed as suitable for the preparation of component b1). The same polyamines do not have to be used for the preparation of components b1) and b2).

The preparation of the polyketimines takes place according in known manner by reacting the starting components while maintaining an equivalent ratio of amino groups to keto groups of 1:1 to 1:1.5. Optionally, catalytic quantities of acid substances (such as p-toluene-sulphonic acid, hydrogen chloride, sulphuric acid or aluminum chloride) may be used to accelerate the reaction.

The reaction takes place at temperature of 20° to 180° C. The reaction may be carried out with the use of an entrainer (e.g., toluene, xylene, cyclohexane and octane) to remove the water of reaction, until such time as the calculated quantity of water (1 mole of water per mole of primary amino group) is dissociated or until no more water is dissociated. The phases are then separated, or the entrainer and any unreacted starting products which may be present are separated by distillation. The products thus obtained may be used without further purification as component b2).

In the binder compositions according to the invention, the individual components b1) and b2) are present in quantities corresponding to a weight ratio of 95:5 to 5:95, preferably 80:20 to 20:80. The amounts of components a), b1) and b2) in the binder compositions corresponding to a weight ratio of 95:5 to 5:95, preferably 80:20 to 20:80. The amounts of components a), b1) and b2) in the binder compositions are determined such that the equivalent ratio of isocyanate groups to isocyanate-reactive groups or potential isocyanate-reactive groups is 0.8:1 to 2:1, preferably 0.8:1 to 1.2:1.

The preparation of the binders to be used according to the invention takes place by mixing the individual components either in the absence of solvents or in the presence of known solvents from polyurethane coatings technology. Suitable solvents include ethyl acetate, butyl acetate, methoxypropyl acetate, methylisobutyl ketone, xylene, N-methylpryrrolidone, petroleum ether, chlorobenzenes, Solvesso solvents and mixtures of these solvents.

Generally, in the coating compositions to be used in the process according to the invention, the weight ratio of the total quantity of binder components a) and b) to solvent is 40:60 to 100:0, preferably 60:40 to 90:10.

Known additives from coating technology may also be used in the coating compositions according to the invention. These include, in particular, pigments, fillers, flow aids, catalysts and anti-settling agents.

The properties of the coatings obtained in the process according to the invention may be adjusted in particular by a suitable choice of the type and amounts of the starting components a), b1) and b2).

In order to carry out the process according to the invention, the coating compositions are applied in one or more layers to any substrates by known methods, for example, by spraying, brushing, dipping, immersion or with the aid of rollers or doctor blades. The process according to the invention is suitable for the preparation of coatings on any substrates such as metals, plastics, wood or glass. The process according to the invention is particularly suitable for the preparation of coatings on steel sheet, which is used, for example, in the production of vehicle bodies, machines, cladding sheet, drums or containers. The substrates to be coated by the process according to the invention may be provided with suitable primers before the process according to the invention is carried out.

The coatings corresponding to the process of the invention may be dried over a wide temperature range of 0° to 160° C.

The surface protection that can be achieved with the process according to the invention is demonstrated in the examples below. All parts and percentages are by weight unless otherwise indicated.

EXAMPLES

The following starting materials are used in the examples below.

Polyisocyanates a)

Polyisocyanate I

A commercial lacquer polyisocyanate containing isocyanurate groups, obtained by the trimerization of hexamethylene diisocyanate, present as a 90% solution in butyl acetate/solvent naphtha 100 (1:1). NCO content of the solution: 19.4%, viscosity of the solution: approx. 700 mPa.s (23° C.).

Polyaspartic Ester b1)

Polyaspartic Ester I

The polyaspartic ester obtained by adding 1 mole of 4,4'-diaminodicyclohexylmethane to 2 moles of diethyl maleate (according to EP-A 0,403,921). Equivalent weight: approx. 280 g/NH, viscosity: approx. 1,500 mPa.s (23° C.).

Polyaspartic Ester II

The polyaspartic ester obtained by adding 1 mole of a mixture of hexahydro-2,4- and 2,6-diaminotoluene (weight ratio 65:35) to 2 moles of diethyl maleate. Equivalent weight: approx. 265 g/NH, viscosity: approx. 350 mPa.s (23° C.).

Polyketimine b2)

Polyketimine I

A commercial ketimine obtained from 1 mole of 1-amino-3,3,5-trimethyl-5-aminomethylcyclohexane (IPDA) and 2 moles of methyl-isobutyl ketone. Viscosity: approx. 80 mPa.s (23° C.). Equivalent weight: 167 g.

The coating compositions described in Table 1 were applied with a doctor blade to previously degreased glass plates and dried in accordance with the data in the table below. The amounts are set forth in parts by weight.

TABLE

| Example No. | 1 | 2 | 3 |
|---|---|---|---|
| Polyisocyanate | I | I | II |
| Polyaspartic ester b1) | 118.3 | 87.6 | 121.8 |
|  | 22.2 | 80.0 | 20.0 |
| Polyketimine I | 80.0 | 20.0 | 80.0 |
| Equivalent ratio[1] | 1.0 | 1.0 | 1.0 |
| Solvent[2] | 37.6 | 36.0 | 43.4 |
| Solids content (% by wt.) | 80 | 80 | 80 |
| Drying | 60'/60° C. | RT | 30'/120° C. |
| Dry to handle | after drying | 0.5 h | after drying |
| Solvent resistance[3] | | | |
| Methoxypropyl acetate | 0 | 0 | 0 |
| Toluene | 0 | 0 | 2 |
| Ethyl acetate | 0 | 1 | 3 |
| Acetone | | | |
| Pencil hardness | 2H | 2H | 2H |
| Film thickness (μm) | 50 | 50 | 50 |

[1]Equivalent ratio of isocyanate groups to the sum of isocyanate-reactive groups and potential isocyanate-reactive groups;
[2]The solvent used was the one present in the polyisocyanate;
[3]The test consisted of placing a solvent-impregnated swab on the coating surface for one minute (0 = film unchanged, 5 = film destroyed).

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the preparation of coatings by coating a substrate with a coating composition having a two-component binder containing
    a) a polyisocyanate component and
    b) an isocyanate-reactive component which is essentially free of hydroxyl groups and contains
        b1) 5 to 95 parts by weight of compounds having the formula

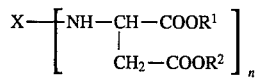

wherein
      X represents an n-valent radical which is inert towards isocyanate groups and obtained by removing the primary amino groups from an organic polyamine having a number average molecular weight ($M_n$) of 60 to 6000 and containing n (cyclo)aliphatically bound amino groups,
      $R^1$ and $R^2$ represent the same or different alkyl radicals having 1 to 18 carbon atoms, n represents a whole number of at least 2
   and
      b2) 5 to 95 parts by weight of compounds having a number average molecular weight ($M_n$) of 140 to 6500 and having at least two ketimine units per molecule corresponding to the formula

wherein the sum of the parts by weight of components b1) and b2) is 100, based on the weight of component b1) and b2).

2. The process of claim 1 wherein X represents the radical obtained by removing the amino groups from 1-amino-3,3,5-trimethyl-5aminomethylcyclohexane, 4,4'-diaminodicyclohexylmethane, 3,3'-dimethyl-4,4'-diaminodicyclohexylmethane, hexahydro-2,4-and/or 2,6-diaminotoluene, the isomers of C-monomethyl-diaminodicyclohexylmethane or 3(4)-aminomethyl-1-methylcyclohexylamine.

3. The process of claim 1 wherein $R^1$ and $R^2$ represent a methyl, ethyl, n-butyl or 2-ethylhexyl group and n is 2.

4. The process of claim 2 wherein $R^1$ and $R^2$ represent a methyl, ethyl, n-butyl or 2-ethylhexyl group and n is 2.

5. The process of claim 1 wherein compounds b2) have a number average molecular weight ($M_n$) of 140 to 6500 and correspond to the formula

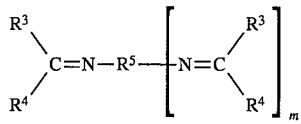

wherein
   $R^3$ and $R^4$ may be the same or different and represent hydrocarbon radicals having up to 8 carbon atoms, or the radicals $R^3$ and $R^4$, together with the carbon atom form a cycloaliphatic 5- or 6-membered ring,
   $R^5$ represents an (m+1)-valent radical obtained by removing the primary amino groups from an organic polyamine having a number average molecular weight ($M_n$) of 88 to 2 000 and containing m+1 (cyclo)aliphatically bound primary amino groups, and m is 1 to 3.

6. The process of claim 5 wherein $R^5$ represents a radical obtained by removing the primary amino groups from a polyamine having a molecular weight of 88 to 238 and m is 1.

7. The process of claim 5 wherein $R^5$ represents the radical obtained by removing the amino groups from 1-amino-3,3,5-trimethyl-5-aminomethylcyclohexane, 4,4'-diaminodicyclohexylmethane, 3,3'-dimethyl-4,4'-diaminodicyclohexylmethane, hexahydro-2,4- and/or 2,6-diaminotoluene or the isomers of C-monomethyl-diaminodicyclohexylmethane or 3(4)-aminomethyl-1-methylcyclohexylamine.

8. The process of claim 5 wherein radicals $R^3$ and $R^4$ represent hydrocarbon radicals having up to 8 carbon atoms.

9. The process of claim 6 wherein radicals $R^3$ and $R^4$ represent hydrocarbon radicals having up to 8 carbon atoms.

10. The process of claim 7 wherein radicals $R^3$ and $R^4$ represent hydrocarbon radicals having up to 8 carbon atoms.

11. The process of claim 1 wherein the equivalent ratio of isocyanate groups of component a) to isocyanate-reactive groups and potential isocyanate-reactive groups of component b) is 0.8:1 to 2:1.

* * * * *